(12) United States Patent
Fruth et al.

(10) Patent No.: US 11,712,852 B2
(45) Date of Patent: Aug. 1, 2023

(54) AUTOMATIC ADJUSTMENT OF A HEATER CONTROL IN AN ADDITIVE MANUFACTURING DEVICE

(71) Applicant: EOS GmbH Electro Optical Systems, Krailling (DE)

(72) Inventors: Albert Fruth, Germering (DE); Peter Keller, Krailling (DE); Markus Schmidtner, Landsberg am Lech (DE)

(73) Assignee: EOS GmbH Electro Optical Systems, Krailling (DE)

( * ) Notice: Subject to any disclaimer, the term of this patent is extended or adjusted under 35 U.S.C. 154(b) by 185 days.

(21) Appl. No.: 17/164,430

(22) Filed: Feb. 1, 2021

(65) Prior Publication Data

US 2021/0154938 A1 May 27, 2021

Related U.S. Application Data

(62) Division of application No. 15/622,099, filed on Jun. 14, 2017, now Pat. No. 10,953,601.

(30) Foreign Application Priority Data

Jun. 23, 2016 (DE) .......................... 1020162113135

(51) Int. Cl.
*B29C 64/386* (2017.01)
*B29C 64/153* (2017.01)
(Continued)

(52) U.S. Cl.
CPC .......... *B29C 64/386* (2017.08); *B29C 64/153* (2017.08); *B29C 64/295* (2017.08);
(Continued)

(58) Field of Classification Search
CPC ... B29C 64/393; B29C 64/295; B29C 64/153; B33Y 50/00
See application file for complete search history.

(56) References Cited

U.S. PATENT DOCUMENTS 5,908,569 A * 6/1999 Wilkening ............ B29C 64/153
313/115
2003/0044593 A1 3/2003 Vaidyanathan et al.
(Continued)

FOREIGN PATENT DOCUMENTS

DE  102004029103  6/2005
DE  102014011187  2/2016
(Continued)

OTHER PUBLICATIONS

Omron, "Technical Guide for Temperature Controllers" available online at least as of Mar. 12, 2015, https://web.archive.org/web/20150312090342/http://edata.omron.com.au/eData/TCs/Temperature_TG.pdf) (Year: 2015).*

(Continued)

*Primary Examiner* — Larry W Thrower
(74) *Attorney, Agent, or Firm* — Seyfarth Shaw LLP

(57) ABSTRACT

A device for an adjustment of a heater control includes a nominal parameter provision unit designed such that it provides at least one nominal parameter value, an actual parameter detection unit designed such that it is able to detect for at least one of the nominal parameter values the corresponding actual parameter value in a heater control or in an additive manufacturing device, wherein an actual parameter value is the actual value of a controlled variable and/or the actual value of its change with time and/or the actual value of a heater parameter and/or the actual value of its change with time, and a control change unit that automatically changes at least one control parameter value, if a predefined difference between the nominal parameter value and its corresponding actual parameter value is exceeded.

12 Claims, 3 Drawing Sheets

(51) Int. Cl.
  *B29C 64/393* (2017.01)
  *B29C 64/295* (2017.01)
  *B33Y 10/00* (2015.01)
  *B33Y 30/00* (2015.01)
  *B33Y 50/02* (2015.01)

(52) U.S. Cl.
  CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 2004/0104499 A1* | 6/2004 | Keller | B29C 64/153 |
| | | | 425/375 |
| 2004/0266222 A1 | 12/2004 | Sata | |
| 2006/0145381 A1 | 7/2006 | Larsson | |
| 2006/0157454 A1 | 7/2006 | Larsson | |
| 2006/0157892 A1 | 7/2006 | Larsson | |
| 2006/0228248 A1 | 10/2006 | Larsson | |
| 2011/0165340 A1 | 7/2011 | Baumann | |
| 2014/0156053 A1 | 6/2014 | Mahdavi et al. | |
| 2015/0331402 A1 | 11/2015 | Lin et al. | |
| 2016/0167309 A1 | 6/2016 | Liu et al. | |
| 2016/0193790 A1 | 7/2016 | Shuck et al. | |
| 2016/0325496 A1 | 11/2016 | DePena et al. | |
| 2016/0332384 A1 | 11/2016 | DePena et al. | |
| 2016/0339641 A1 | 11/2016 | Ho et al. | |
| 2017/0102689 A1 | 4/2017 | Khajepour et al. | |
| 2017/0144378 A1 | 5/2017 | Giera | |
| 2017/0239719 A1 | 8/2017 | Buller et al. | |
| 2018/0099333 A1 | 4/2018 | DehghanNiri et al. | |
| 2018/0341248 A1 | 11/2018 | Mehr et al. | |

FOREIGN PATENT DOCUMENTS

| | | |
|---|---|---|
| DE | 102015214690 | 2/2017 |
| EP | 0764079 B1 | 3/1997 |
| WO | 2015108547 | 7/2015 |

OTHER PUBLICATIONS

D'Emilia (D'Emilia, Giulio, Marra, Antonio, and Natale, E., Use of neural networks for quick and accurate auto-tuning of PID controller, Robotics and Computer-Integrated Manufacturing, V23, I.2, Apr. 2007, pp. 170-179). (Year: 2007).*

* cited by examiner

AUTOMATIC ADJUSTMENT OF A HEATER CONTROL IN AN ADDITIVE MANUFACTURING DEVICE

TECHNICAL FIELD OF THE INVENTION

The invention refers to a device and a method for an adjustment of a heater control in a layer-wise additive manufacturing device and to an additive manufacturing device and control unit in the same adapted to the method.

BACKGROUND OF THE INVENTION

In the European patent document EP 0 764 079 B1 a laser sintering device is described, in which an application device applies layers of the building material onto a support or a previously selectively solidified layer, whereupon a solidification device solidifies the positions of the building material in the layer that correspond to the respective object cross-section. Before the applied powder is solidified, it is pre-heated by means of a heating device. The goal of the invention in EP 0 764 079 B1 is to have a temperature of the building material in a layer as uniform as possible before the solidification in order to allow for identical solidification conditions within the layer.

EP 0 764 079 B1 states that in particular after the application of a new (cold) powder layer it takes some time until the whole powder layer has been brought to the desired temperature by heat transport, as the radiative heat emitted from the heating device warms up only the surface of the powder layer. In order to take into consideration this circumstance, an adjustment of the heating power is provided. As the time necessary for warming up the newly applied powder does not contribute to the build progress, by said adjustment the time for a warming-up of the powder shall be kept as short as possible. This is particularly relevant for layers, in which only a small fraction of the area shall be solidified. In these layers only a small period of time is needed for the solidification. In order to determine the appropriate regulation parameters as precisely as possible, EP 0 764 079 B1 suggests determining the heat transfer behavior of the building material.

SUMMARY OF THE INVENTION

The inventors of the present application have found that the behavior of the heater control does not only depend on the powder material that is used. Rather, also the additive manufacturing device (for example its heat dissipation capability in different regions of the build area) has an influence on the behavior of the heater control. In particular, even for the same device type differences occur between individual devices.

Therefore, the object of the present invention is an improvement of a heating regulation in an additive manufacturing device.

The object is achieved by a device for an adjustment of a heater control according to claim 1, a method for adjusting a heater control according to claim 9, a control unit according to claim 12, an additive manufacturing device according to claim 13 and a computer program according to claim 14. Further developments of the invention are specified in the dependent claims. Here, features that are mentioned in the dependent claims and in the following description, respectively, with respect to a claim category can also be used for developing further the subject-matters of every other claim category, except this is explicitly excluded.

An inventive device for an adjustment of a heater control in an additive manufacturing device, in which additive manufacturing device a number of objects can be manufactured by a layer-wise application of building material layers, in particular powder layers, on top of each other, in that in a plurality of building material layers the positions corresponding to the cross-sections of the objects in the respective building material layer are solidified by means of radiation, wherein the heater control regulates the heating of an applied building material layer by means of a heating device up to a work temperature $T_A$ and is able to regulate the value of at least one predetermined controlled variable based on at least one control parameter by changing the value of at least one predetermined manipulated variable, comprises:

a nominal parameter provision unit designed such that it provides at least one nominal parameter value, meaning the setpoint of a controlled variable and/or its change with time and/or the setpoint of a heater parameter and/or its change with time, an actual parameter detection unit designed such that it is able to detect for at least one of the nominal parameter values the corresponding actual parameter value in the heater control or in the additive manufacturing device, wherein an actual parameter value is the actual value of a controlled variable and/or the actual value of its change with time and/or the actual value of a heater parameter and/or the actual value of its change with time, and a control change unit that automatically changes at least one control parameter value, if a predefined difference between the nominal parameter value and its corresponding actual parameter value is exceeded.

By means of the device according to the invention a heater control in a (layer-wise) additive manufacturing device can be automatically modified in its control operation and thus can be adapted to boundary conditions in a specific building process. This improves the quality of the objects manufactured in an additive manufacturing device and moreover leads to a simplified operability of the additive manufacturing device. In the present application the term "number" shall have the meaning "one or more". Due to the manufacturing process, several objects can be manufactured in parallel (meaning simultaneously) in an additive manufacturing device. It shall also be mentioned that the actual parameter detection unit preferably detects for each one of the provided nominal parameter values the corresponding actual parameter value.

Preferably, the heater control uses as manipulated variable the heating power of the heating device used for heating up a building material layer. Thereby the temperature of the upper-most building material layer can be affected most effectively and also for the adjustment of the heater control there result numerous options.

Preferably the at least one control parameter value that is changed is at least one of the following quantities:

the maximum admissible heating power $P_{max}$, the size of the manipulation range of at least one of the manipulated variables, the controlled range around the work temperature $T_A$, within which the heater control actually performs a control, the maximum and/or minimum change of the heating power with time and/or at least one linear factor of a transfer function describing the control behavior. An adjustment of the heater control is particularly effective, if one or more of the mentioned control parameters are changed for the adjustment.

Further preferably one of the changed control parameters is the P gain (meaning the proportional gain), the reset time or the derivative time of a proportional, integral or derivative term of the heater control (for a parallel controller configuration). Here, it is assumed that the controller output u(t) depends in the following way from the controller input e(t):

$$u(t) = K_P \left[ e(t) + \frac{1}{T_N} \int_0^t e(\tau)d\tau + T_V \frac{d}{dt}e(t) \right]$$

wherein $K_P$ designates the P gain, $T_N$ designates the integral time and $T_V$ designates the derivative time.

Particularly when the heater control uses a PD, PI or PID controller, the basic behavior of the controller can be easily brought about by changing the respective linear factors. For example, an asymptotic behavior can be effected or a limitation of the maximum overshoot can be effected.

Preferably, the at least one nominal parameter is at least one of the following quantities:

the work temperature $T_A$, the maximum and/or minimum change of the temperature of the building material with time, the maximum duration for the heating of the building material up to the work temperature $T_A$ from the start of the application of a new building material layer, the control accuracy. Basically, the precision of the adjustment of the work temperature by means of the heater control is of interest. The precision of the adjustment can be specified and controlled particularly well by the listed quantities.

Preferably, the actual parameter detection unit detects the time needed for heating a newly applied building material layer up to the work temperature $T_A$ and the control change unit automatically changes at least one control parameter value, if a predetermined maximum heating-up time is exceeded. Particularly in a series production of parts by means of a (layer-wise) additive manufacturing method the focus is on the necessary manufacturing time. As the heating-up time basically is only an unproductive waiting time, such time should be as short as possible. Here, when proceeding according to the invention, the manufacturing time can be specifically kept as short as possible.

In a preferred variant of the device according to the invention for adjusting a heater control the control change unit uses a fuzzy control for changing the at least one control parameter value. As in an additive manufacturing device many boundary conditions have an influence on the temperature of the building material layer to be solidified, the heater control is complex. Here, a fuzzy control of the control parameters may lead to good results, as the processes that have an influence on the temperature need not be studied down to the last detail.

In a further preferred variant of the device according to the invention for adjusting a heater control the control change unit uses a neural network and/or an evolutionary algorithm for changing the at least one control parameter value, wherein the neural network and/or the evolutionary algorithm access actual parameter values detected in the past by the actual parameter detection unit. Similar to the use of a fuzzy control, it is not necessary to study all processes that have an influence on the temperature of the building material layer to be solidified down to the last detail as for an adjustment of the control parameters it is relied on past experience.

A method according to the invention for adjusting a heater control in an additive manufacturing device, wherein in the additive manufacturing device a number of objects can be manufactured by a layer-wise application of building material layers, in particular powder layers, on top of each other, in that in a plurality of building material layers the positions that correspond to the cross-sections of the objects in the respective building material layer are solidified by means of radiation, wherein the heater control regulates the heating of an applied building material layer by means of a heating device up to a work temperature and regulates the value of at least one predetermined controlled variable based on at least one control parameter by changing the value of at least one predetermined manipulated variable, comprises at least the following steps:

a step S1 of providing at least one nominal parameter value, meaning the setpoint of a controlled variable and/or the setpoint of the change of the controlled variable with time and/or the setpoint of a heating parameter and/or the setpoint of its change with time, a step S2 of detecting at least one actual parameter value in the heater control or the additive manufacturing device, which actual parameter value corresponds to the at least one nominal parameter value, wherein an actual parameter value is the actual value of a controlled variable and/or the actual value of the change of the controlled variable with time and/or the actual value of a heater parameter and/or the actual value of its change of such heater parameter with time, and a step S3 of automatically changing at least one control parameter in case a predefined difference between a nominal parameter value and its corresponding actual parameter is exceeded.

The method according to the invention achieves the same advantages as the device according to the invention. In particular, in step S1 the term "providing a nominal parameter value" also includes a mere access to already known nominal parameter values, which e.g. are stored in a storage in a device for adjusting a heater control. Of course, the nominal parameter values can also be accessed via a network. Basically, what matters only is that the nominal parameter values are somehow available for a comparison with actual parameter values.

Preferably in the course of the method according to the invention exactly n layers are applied and solidified, wherein n is a natural number smaller or equal to the maximum number of layers applied during the manufacturing. In this way, an observation of the control targets is possible not only at the start of a manufacturing process, but also continuously during a manufacturing process, so that an undesired behavior of the heater control can be automatically corrected at once. This increases the quality of the manufactured objects due to a more precise temperature control.

Further preferably the method is carried out also before the application and solidification of the first layer for a manufacture of a number of objects, in that one or more building material layers are applied for test reasons in order to determine and change the control characteristics of the heater control. In this way an additive manufacturing device may by itself carry out an adjustment of the heater control used in such device already when the additive manufacturing device is installed. Thus, build processes may run with an adjusted heater control right from the beginning.

A control unit according to the invention with which an additive manufacturing device may be equipped and/or retro-fitted includes a device according to the invention for adjusting a heater control or is connected to such a device in terms of signaling, wherein the additive manufacturing device is able to manufacture a number of objects by a layer-wise application of building material layers, in particular powder layers, one on top of the other, in that in a plurality of building material layers the positions corresponding to the cross-sections of the objects in the respective building material layer are solidified by means of radiation and wherein the additive manufacturing device comprises:

a building support for supporting the object to be formed;
an application device for applying a building material layer onto the surface of the building support or an already existing layer,
an irradiation device that emits the electromagnetic radiation or particle radiation and is able to irradiate all positions to be solidified in a layer such that the building material at these positions is partially or completely melted and/or joined by the heat energy supplied by the radiation, so that the building material at these positions after having cooled down exists in a solid state, in which it is joined to itself,
a heating device for heating an applied building material layer up to a work temperature and
a heater control that regulates the heating of an applied building material layer up to the work temperature by means of the heating device and is able to regulate the value of at least one predetermined controlled variable based on at least one control parameter by changing the value of at least one predetermined manipulated variable,
wherein the control unit is able to control the application device and the irradiation device such that a building material application step and a solidification step are consecutively repeated until all cross-sections of the at least one three-dimensional object to be manufactured have been solidified.

An additive manufacturing device according to the invention for manufacturing a number of objects by a layer-wise application of building material layers one on top of the other, wherein in each of the building material layers the positions corresponding to the cross-sections of the objects in the respective building material layer are solidified by means of radiation, comprises:

a building support for supporting the object to be formed,
a application device for applying a building material layer onto the surface of the building support or an already existing layer,
an irradiation device that emits the electromagnetic radiation or particle radiation and is able to irradiate all positions to be solidified in a layer such that the building material at these positions is partially or completely melted and/or joined by the heat energy supplied by the radiation, so that after the material has cooled down at these positions, it is in a solid state, in which it is joined to itself,
a heating device for heating an applied building material layer up to a work temperature,
a heater control that regulates the heating of an applied building material layer up to a work temperature by means of the heating device and is able to regulate the value of at least one predetermined controlled variable based on at least one control parameter by changing the value of at least one predetermined manipulated variable, and
a control unit according to the invention.

By the control unit according to the invention and the additive manufacturing device according to the invention a user is provided with devices that make the operation of the additive manufacturing device very easy.

A computer program according to the invention is able to be loaded into a control unit and/or an additive manufacturing device and has program code means for carrying out all steps of a method according to the invention when the computer program is executed in the control unit and/or the additive manufacturing device. By implementing the method according to the invention for adjusting a heater control and the respective device according to the invention by means of a computer program, in particular an easy subsequent installation on already existing control units and/or additive manufacturing devices is possible.

BRIEF DESCRIPTION OF THE DRAWINGS

Further features and advantages of the invention will arise from the description of embodiments based on the attached drawings.

DETAILED DESCRIPTION OF THE EMBODIMENTS

Figure 1:
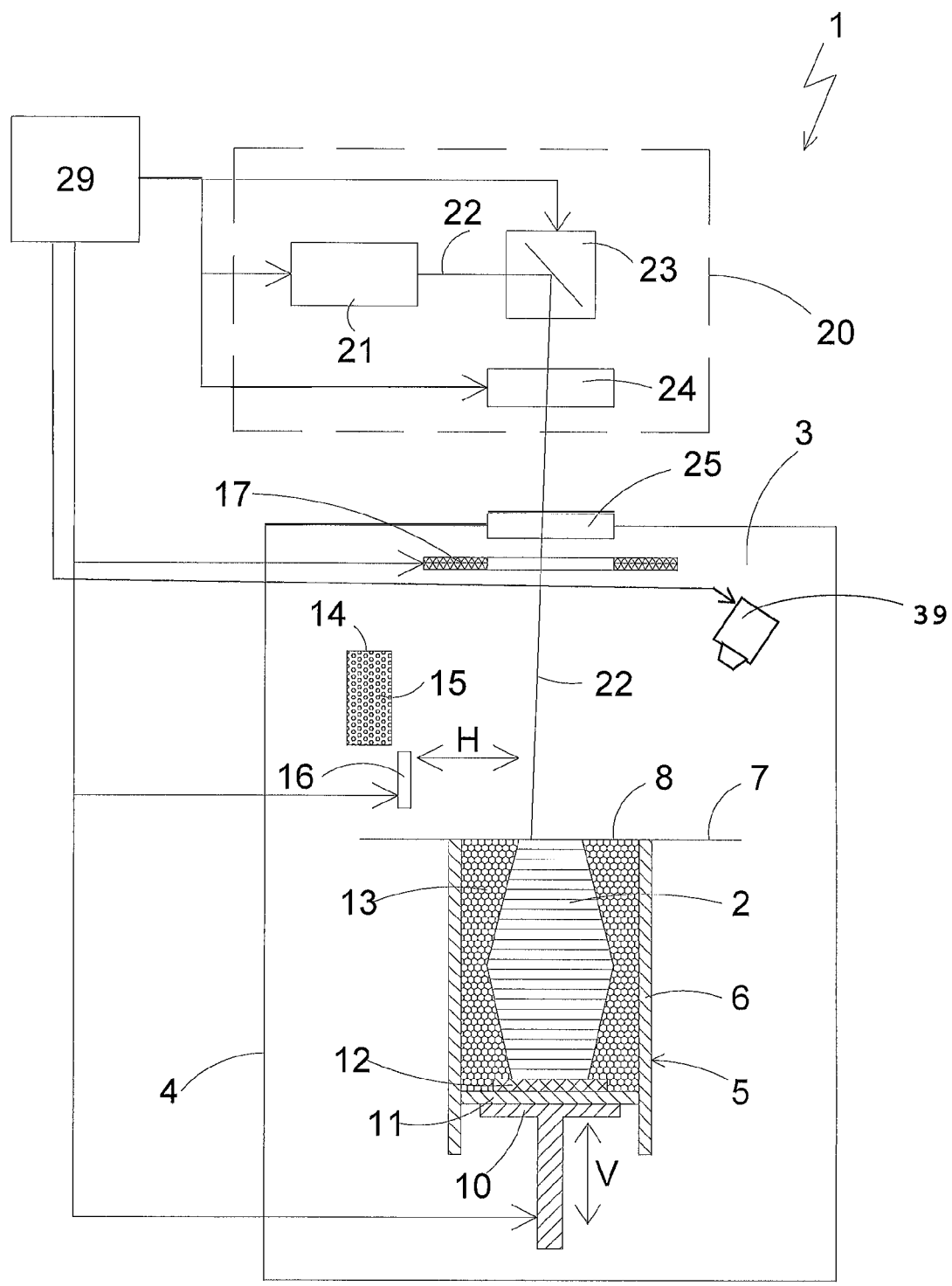
FIG. 1 is a schematic partially sectioned view of a device for an additive manufacturing of a three-dimensional object according to an embodiment of the invention.

In order to describe the approach according to the invention, in the following at first an additive manufacturing device according to the invention is described on the example of a laser sintering or melting device by referring to FIG. 1.

For the construction of an object 2, the laser sintering or laser melting device 1 comprises a process chamber or building chamber 3 having a chamber wall 4.

A container 5 open to the top and having a container wall 6 is arranged in the process chamber 3. The edge of the top opening of the container 5 defines a working plane 7 wherein the region of the working plane 7 that lies inside of the opening, which region can be used for building the object 2, is designated as build area 8.

A support 10 that is movable in a vertical direction V is arranged in the container 5. A baseplate 11 is arranged at the support 10, which baseplate 11 forms the bottom end of the container 5 and thereby forms its bottom. The baseplate 11 may be a plate formed separately from the support 10, which is attached to the support 10, or it may be formed integrally with the support 10. Depending on the powder and the process that are used, a building platform 12 may be additionally attached on the baseplate 11 as building support, on which the object 2 is built. However, the object 2 may also be built on the baseplate 11 itself, which baseplate 11 then serves as building support. In FIG. 1 the object 2 to be formed on the building platform 12 below the working plane 7 in the container 5 is shown in an intermediate state with several solidified layers surrounded by building material 13 that remained unsolidified.

The laser sintering device 1 further comprises a storage container 14 for a building material 15 in powder form that is solidifiable by electromagnetic radiation and a recoater 16 that can be moved in a horizontal direction H for applying the building material 15 within the build area 8. Furthermore, a heating device 17, such as a radiant heater, is arranged in the process chamber 3, which heating device serves for heating the applied building material 15. For example, an infrared heater may be provided as radiant heater. Moreover, the heating device 17 may also alternatively or additionally heat the baseplate 11 and the building platform 12, respectively, and/or the wall of the container 5 (e.g. by means of a heating resistor).

Moreover, the laser sintering device 1 comprises an irradiation device 20 with a laser 21 that generates a laser beam 22, which is deflected by a deflection device 23 and is focused onto the working plane 7 by a focusing device 24 through a coupling window 25 arranged at the top of the process chamber 3 in the chamber wall 4.

Furthermore, the laser sintering device 1 comprises a control unit 29, by means of which the individual components of the device 1 are controlled in a coordinated way for carrying out the building process. Alternatively, the control unit may also be arranged partially or completely outside of the device. The control unit may contain a CPU, the operation of which is controlled by a computer program (software). The computer program may be stored on a storage medium separated from the device, from which storage medium it may be loaded into the device, in particular into the control unit.

The control unit 29 is controlled by a control command set, which a.o. includes data that include the structure of the number of objects to be manufactured, in particular a three-dimensional CAD layer model of the objects with information on the respective cross-section of an object in each layer of the building material that is to be solidified and data that determine the exact parameters for solidifying the building material. In particular, the data include an exact information on each layer to be solidified in the manufacturing of the number of objects. In the prior art it is sufficiently described how a control command set looks like in detail. Therefore, this is not further explained here, as it is not an element of the present invention.

In operation, the control unit 29 lowers the support 10 layer by layer, controls the recoater 16 for applying a new powder layer and controls the deflection device 23 and, if necessary, also the laser 21 and/or the focusing device 24 for solidifying the respective layer at the positions corresponding to the respective object by means of the laser by scanning these positions with the laser.

FIG. 1 also shows a temperature measuring device 39 that is shown inside of the process chamber 3 and thus as part of the laser sintering device 1, but may nevertheless also be arranged outside of the process chamber 3. Such a temperature measuring device may, for example, comprise one or more point pyrometers, which measure the temperature of the building material at one or more positions inside of the build area 8 or, e.g. an infrared camera, by means of which the temperature is detected either in a partial region of the build area 8 or else in the whole build area 8.

Apart from laser sintering, the invention covers all those additive manufacturing methods, in which by an introduction of radiative energy a solidification of the building material is effected, such as laser melting methods, mask processes, in which masks are used for a selective solidification of a material layer, stereolithography methods, etc. Also an application in a fused deposition modeling method is possible. The additive manufacturing device that was described above as an example will, of course, have a different setup known from the prior art in case the method is not a laser sintering or melting method. Similarly, an additive manufacturing device for carrying out a laser sintering or melting method according to the invention also covers technical modifications with respect to the above-described example.

The irradiation device may, for example, comprise one or more gas or solid-state lasers or any other type of laser, such as laser diodes, in particular VCSEL (Vertical Cavity Surface Emitting Laser) or VECSEL (Vertical External Cavity Surface Emitting Laser), or a line of such lasers. In general, instead of a laser any device can be used that is suited to selectively apply energy in the form of wave or particle radiation onto a layer of the building material. For example, instead of a laser another light source, an electron beam or any other energy or radiation source can be used that is suited to solidify the building material.

All powders, powder mixtures and paste-like materials, respectively, that are suited for the laser sintering or melting process may be used as building materials. Such materials include e.g. plastics such as polyamide or polystyrene, PAEK (Polyarylene Ether Ketone), elastomers such as PEBA (Polyether Block Amide), plastic-coated sand, ceramic and metals, such as for example high-grade steel, in particular also alloys or special metal powders adapted to the respective purpose. In a stereolithographic method photopolymers, e.g. acrylic, epoxy or vinyl ester resins are used.

In the following, a control according to the invention of the heating device 17, for example a radiant heater, is described by making reference to FIG. 2. As already mentioned, the heating device 17 serves in a laser sintering or melting device a.o. for heating a newly applied building material layer up to a work temperature $T_A$, at which the building material shall be solidified by means of the heat amount additionally introduced by radiation. The work temperature $T_A$ is a target temperature of the building material that preferably approximately provides for an optimal solidification by means of the radiation and can e.g. be found by pre-tests with the building material or is known from experience from previous solidification processes with the building material. In case there are temperature differences within the build area, the work temperature $T_A$ means the mean temperature in the build area in a layer to be solidified, which mean temperature the building material should preferably have when being solidified.

When the building material is pre-heated, the heat amount shall be introduced into the building material layer preferably as uniformly as possible in order to keep the temperature differences between solidified and not solidified regions in a building material layer as small as possible in order to avoid warpage and stress, respectively. Namely, a high amount of heat that is introduced locally e.g. by means of a laser beam, leads to high temperature differences between the point of incidence of the beam and its surrounding. Therefore, the work temperature $T_A$ should be as close as possible to the temperature at which the solidification occurs. However, the work temperature $T_A$ should not already provoke a solidification without the radiation used for the solidification.

There are temperature variations within a building material layer not only due to the actual irradiation by means of the radiation used for the solidification. Rather, also already solidified (and thus hot) positions below a newly applied building material layer lead to temperature inhomogeneities in the newly applied layer. Furthermore, also the heat dissipation capability of the components of the additive manufacturing device surrounding the build area as well as effects of an optionally used protective gas flow play a role.

For controlling the heating device 17 it is necessary to measure the temperature of the upper-most layer that shall be selectively solidified at one or more positions by means of a detector. FIG. 1 shows for that purpose a temperature measuring device 39 arranged in the process chamber 3 above the build area 8. Based on the temperature information determined by the temperature measuring device 39, the control unit 29 then controls the heating device 17 such that the temperature in the measurement region of the temperature measuring device 39 inside of the build area is as close as possible to the work temperature. This is described in more detail in the following by making reference to FIG. 2.

Figure 2:
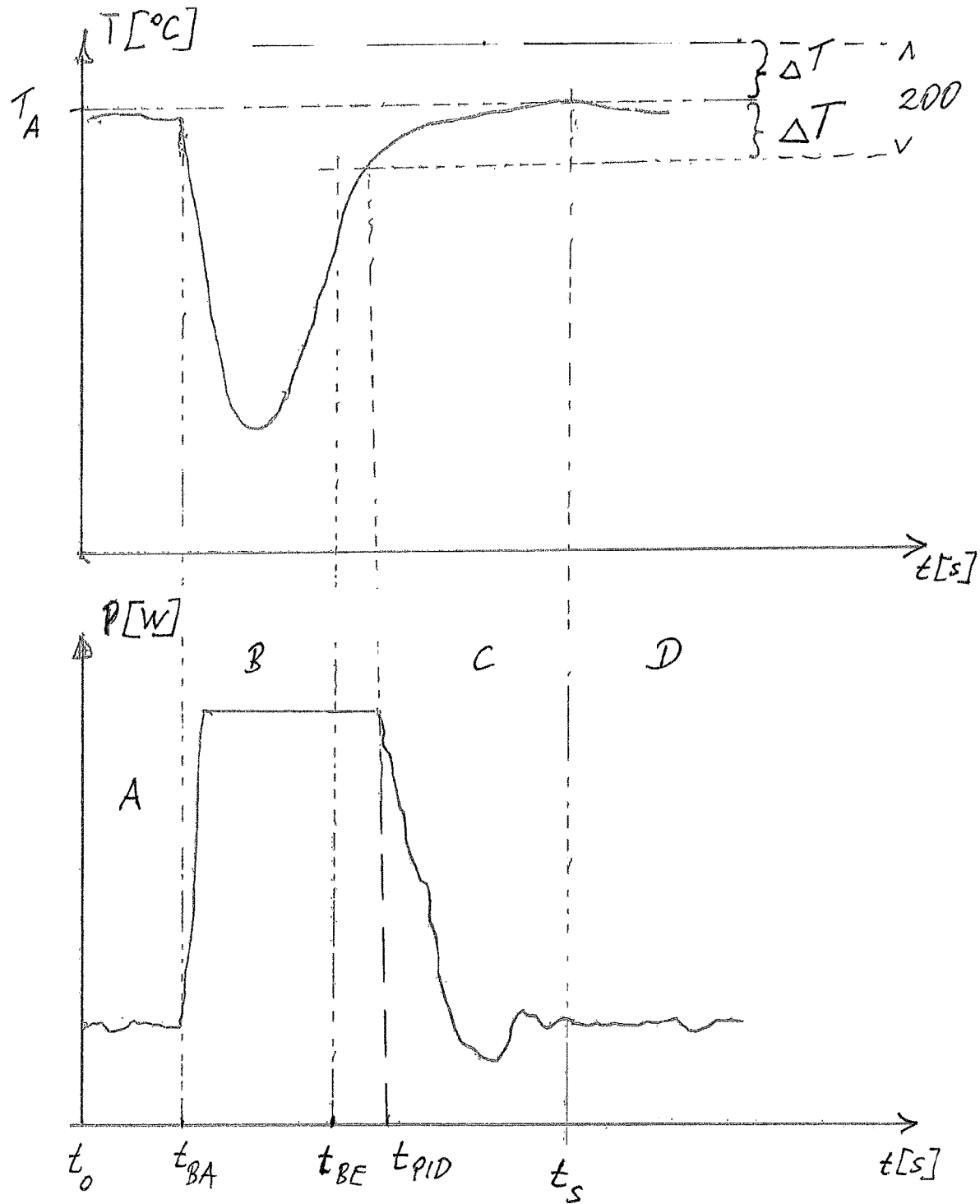
FIG. 2 are two diagrams showing the time dependency of the temperature and of the heating power.

The upper half of FIG. 2 shows the temperature T (in °C. without a scale of the T axis) detected by the temperature measuring device 39 at a certain position within the build area in dependence of the time t (in seconds without scale of the t axis). Of course, the temperature T may also be an average value of temperatures detected at several positions of the measurement region, in particular all positions. However, in FIG. 2 it is assumed that the measurement region of the temperature measuring device 39 does not cover the whole build area.

The lower half of FIG. 2 shows the heating power P (in W without scale of the P axis) of the heating device 17 depending on the time t, wherein the time axis in the upper and lower halves of FIG. 2 is the same, i.e. in particular the time units in the upper and lower halves of FIG. 2 are identical.

The time $t_0$ characterizes the time at which the recoater 16 starts moving in a horizontal direction H across the build area 8 (see FIG. 1).

The time $t_{BA}$ characterizes the point in time from which building material 15 that has been newly applied by the recoater 16 exists at the position measured by the temperature measuring device 39 and in the measurement region of the temperature measuring device 39, respectively. In other words, between the times $t_0$ and $t_{BA}$ the temperature measuring device does not measure the temperature of the newly applied building material, but the temperature of an upper-most building material layer that has already been selectively solidified. To simplify matters, it is assumed here that in the setting represented in FIG. 2 no solidification has occurred within the measurement region of this layer. In FIG. 2 the time period between $t_0$ and $t_{BA}$ is characterized by the letter A.

Starting with the time $t_{BA}$, more and more newly applied powder of a lower temperature T exists within the measurement region. Therefore, in the upper half of FIG. 2 a decrease of the temperature T detected by the temperature measuring device 39 can be seen. The temperature T decreases down to a minimum value and rises again afterwards. The rise of the temperature after a minimum has been reached is due to an increase of the heating power of the heating device from the time $t_{BA}$ on, as it is shown in the lower half in FIG. 2.

Namely, in response to the falling temperature transferred by the temperature measuring device 39, the control unit 29 regulates the heating power within a short time up to a plateau value (maximum value). Thus, by the increased heating power a too strong temperature decrease is compensated.

In FIG. 2, the further time $t_{BE}$ is shown as that point in time from which the recoater has left the measurement region of the temperature measurement device, in other words the time at which the recoater 16 has applied new building material in the whole measurement region. In FIG. 2, the time period between $t_{BA}$ and $t_{BE}$ is designated by the letter B.

As soon as the temperature of the building material detected by the temperature measuring device 39 has approached the work temperature except for a predetermined difference ΔT, the control unit 29 reduces again the heating power P. In FIG. 2, $t_{PID}$ designates the point in time, from which the temperature detected by the temperature measuring device 39 has approached again the work temperature except for a value ΔT. Finally, the work temperature is reached at the time $t_S$. In FIG. 2, the time period between $t_{PID}$ and $t_S$ is designated by the letter C.

Then, starting with the time $t_S$, the heat control tries to keep the temperature always within a control region 200 between $T_A$−ΔT and $T_A$+ΔT. This is characterized in FIG. 2 by the fact that in the time period designated with the letter D the temperature as well as the heating power are running more or less horizontally. The time $t_S$ could also be for example the time at which the control unit 29 triggers the start of the selective solidification of the building material in the just applied building material layer by means of the illumination device 20.

The control may e.g. be a continuous action control with e.g. a P, PI, PD or PID behavior. Thereby the temperature can be controlled such that it is always within the control region 200 between $T_A$−Δt and $T_A$+ΔT. However, a non-continuous control would also be conceivable. The control itself may be an analog control as well as a digital control.

As already mentioned in the introduction, the inventors have found that there are differences from layer-wise additive manufacturing device to layer-wise additive manufacturing device, for example due to a different heat dissipation capability in the region of the build area. Here, the inventors have come to the conclusion that the control parameters should be set individually for a certain layer-wise additive manufacturing device. For example, in a layer-wise manufacturing device having a strong heat dissipation away from the build area a preset heating power could lead to a smaller temperature increase per time unit in the build area, which would prolong the control period until the work temperature is reached (in FIG. 2 this corresponds to $t_S$-$t_0$). However, as the installation procedure for a layer-wise additive manufacturing device should not become more complicated by the fact that the users concerned with the installation must have profound knowledge on the individual behavior of the layer-wise manufacturing device, an automatic adjustment of the control parameters is suggested.

Figure 3:
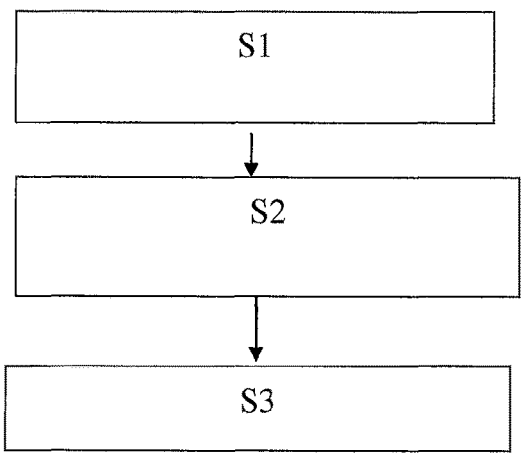
FIG. 3 is a diagram representing schematically the steps of the method according to the invention of adjusting a heater control in an additive manufacturing device.
Figure 4:
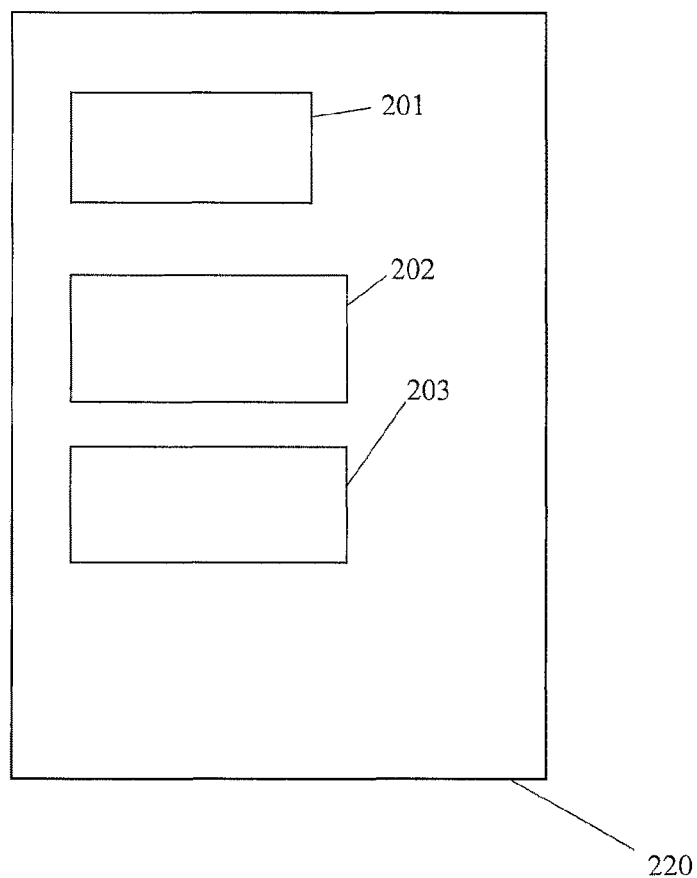
FIG. 4 is a diagram representing schematically the setup of a device according to the invention for adjusting a heater control in an additive manufacturing device.

FIG. 4 schematically shows a device 220 for automatically adjusting the heating control in a layer-wise additive manufacturing device. The functioning of the device 220 in FIG. 4 is explained with reference to FIG. 3. Here, the device 220 in FIG. 4 on the one hand may be a part of the control unit 29, for example as software module that is installed in the control unit 29, on the other hand the device 220 may also be provided as module separated from the control unit 29, which module either is connected with the control unit 29 and possibly also with the temperature detection unit 39 for a data exchange. Furthermore, the device 220 need not be a physical part of the layer-wise additive manufacturing device. Rather, it may also be arranged outside of the layer-wise additive manufacturing device and be connected to the same merely by means of a data connection.

The device 220 for an adjustment of a heater control first of all comprises a nominal parameter provision unit 201. Here, nominal parameters are for example:

target values for controlled variables of the heater control aimed at with the heater control, e.g. the work temperature $T_A$, the change of controlled variables with time, for example the maximum or minimum change of the temperature of the building material with time at a certain position, the maximum time duration for heating the building material up to a work temperature $T_A$ from the start of the application of a new building material layer (in FIG. 2 the period between $t_S$ and $t_0$), the control accuracy of the heater control. In control engineering the control accuracy is a measure for the precision with which a target value for a controlled variable is met. For example, the accuracy of the control may be determined by means of the ITAE criterion which sums up for example deviations of the temperature from the work temperature during the control action, wherein the deviations with respect to the work temperature $T_A$ are weighted by the time duration of the deviation. Another possibility of assessing the accuracy of the control would be choosing as control criterion the maximum deviation of the temperature from the work temperature during the control period.

The term "provision" means that the nominal parameter provision unit 201 reads the values of nominal parameters on which the adjustment of the heater control shall be based for example from a memory or else receives these nominal parameters from an input device, at which a user inputs values of these nominal parameters. The memory device in which the nominal parameter values are stored, can for example be a part of the device 220 for adjusting the heater control. Alternatively, the device 220 may be connected to such a memory via a data connection, wherein the memory either is provided in the control unit 29 or else is provided in a different data processing device physically separated from the layer-wise additive manufacturing device. Here, there are many configuration options immediately evident to the skilled person. A data input device at which a user can input nominal parameter values may be provided at the layer-wise additive manufacturing device. Alternatively, it may be physically separated from the layer-wise additive manufacturing device, however be connected to the layer-wise additive manufacturing device and in particular to the device 220 via a data connection. The detailed implementation of the data input interface can be carried out in the usual way, in particular also by using graphical elements on a display screen.

In a modification of the invention the nominal parameter provision unit 201 is able to receive the nominal parameters on which the adjustment shall be based and not only the values of these parameters. Again, in such a case the nominal parameters can be retrieved from a memory or can be received from a user input interface. Then, in this modification, the device 220 can choose its mode of operation depending on the received nominal parameters. For example, the device 220 can be constructed such that several modes of operation are possible, so that by an input of a certain set of nominal parameters the device 220 is prompted to carry out the adjustment based on these control parameter (values).

Furthermore, the device 220 for adjusting the heater control comprises an actual parameter detection unit 202. The actual parameter detection unit 202 detects the actual value of a parameter assigned to a nominal parameter, for example in a case in which the nominal parameter is the work temperature $T_A$, the actual work temperature $T_A$ (possibly the medium work temperature $T_A$) in the layer-wise additive manufacturing device. For this, the device 220 is for example connected to the temperature measuring device 39 in terms of signaling or else the device 220 receives the measurement data captured by the temperature measurement device 39 (possibly after these data have been pre-processed) from the control unit 29. In case the nominal parameter is the change of the temperature of the building material with time, the actual parameter detection unit 202 may detect the actual temporal behavior in the layer-wise additive manufacturing device by means of the measurement data of the temperature measurement device 39. The same applies to other nominal parameters such as the control accuracy or the time duration for heating the building material up to the work temperature $T_A$ from the start of the application of a new building material layer.

Finally, the reference number 203 in FIG. 4 designates a control change unit, in which the preset nominal parameter values are compared with the detected actual parameter values. In case a difference between a nominal parameter value and the detected actual parameter value is larger than a predetermined deviation, the control change unit 203 automatically changes at least one control parameter value of the heater control. Examples for such control parameters are the following:

The size of the manipulation range of at least one of the manipulated variables of the heater control such as the admissible maximum heating power $P_{max}$ of the heating device 17 during the control process. Usually, the available heating power is determined by the properties of the heating device 17. In contrast to this, the admissible maximum heating power $P_{max}$ during the control process here means a heating power that is at most the heating power that can be supplied by the heating device 17 and thus may definitely be smaller than the available heating power.

The minimum or maximum change of the heating power with time.

The size of the control range 200; thereby it is defined, how much the actual temperature of the building material during the control in the region D in FIG. 2 may deviate from the work temperature $T_A$. In particular, this control region 200 may also have a gap, so that e.g. there is no control for very small deviations from the work temperature $T_A$.

The control type; particularly for a PID controller this refers to the specific parameters of the P and/or I and/or D term such as for the P term the contribution of the proportional amplification or for the I term the integral time or for the D term the derivative time. Of course, this applies analogously also to PI, PD and PT controllers. In particular, by the last-mentioned changes also the size of overshoots when controlling the work temperature $T_A$ may be limited.

Preferably, the control change unit 203 comprises a processor unit for determining the control parameter values to be changed. How one has to change the control parameter values in detail when there is a deviation of an actual parameter value from a nominal parameter value is known to a skilled person on the field of control engineering. Thus, a corresponding automatic algorithm may be implemented by such a skilled person easily. In particular, it is also possible to use a fuzzy control for determining which control parameter values shall be changed how. Alternatively, also a neural network and/or an evolutionary algorithm may be used, which make a decision based on deviations between the nominal parameter values and actual parameter values detected in the past and/or the reaction of the control behavior on a control parameter change made in the past. In particular, it is also possible to apply one or more building material layers merely for test reasons before the application and solidification of the first layer for manufacturing objects in order to determine the control behavior of the heater control for changes of the control parameters.

In particular, the control change unit 203 may be a self-learning system that continuously learns during an additive layer-wise manufacturing process.

As illustrated in FIG. 3, a method for adjusting a heater control comprises the steps S1 (providing nominal parameter values), S2 (detecting the actual parameter values corresponding to the nominal parameter values) and S3 (changing at least one control parameter in case the difference between a nominal parameter value and a detected corresponding actual parameter value exceeds a predetermined deviation). In order to avoid repetitions, with respect to the course of the process reference is made to the above description of the device 220 for an adjustment of the heater control, wherein there is a correspondence between the step S1 and the nominal parameter provision unit 201, the step S2 and the actual parameter detection unit 202 and the step S3 and the control change unit 203.

By a device for adjusting the heater control according to the invention and a method according to the invention it is not only possible to address variations of the device properties from device to device. Rather, also variations of the environmental conditions during a manufacturing process of objects in a layer-wise additive manufacturing device can be addressed. For example, the temperature of a newly applied building material may vary slightly from manufacturing process to manufacturing process or even from layer to layer. Furthermore, during the manufacturing process there could be temperature effects of a flow of a shielding gas or else the heating-up behavior could change due to changing layer thicknesses. In view of an automatically running manufacturing process it was up to now not possible to address such variations. By the automatic adjustment of the heater control according to the invention, however, now the quality of the manufactured objects may be improved in that also such fluctuations during the manufacturing process may be compensated.

Finally, it shall be mentioned that a device 220 for adjusting a heater control in an additive manufacturing device can either be implemented by software components alone or else can be implemented by mixtures of hardware and software. Interfaces mentioned in the present application need not necessarily be implemented as hardware components, but can also be implemented as software modules, for example when the data supplied to them or output by them are taken from other components implemented in the same device or have to be transferred to another component only by means of software. Also, several interfaces may be combined in a common interface such as an input output interface. In particular, the device 220 can be integrated into a control unit 29 of an additive manufacturing device.

The invention claimed is:

1. A control device for adjusting a heater control in an additive manufacturing apparatus that builds one or more objects at a time through a layer-wise application of building material, each new layer being on top of and solidified to a previous underlying layer, with a plurality of building material layers corresponding to cross-sections of the one or more objects, the building material being heated prior to solidifying by a heating device controlled by the heater control, a functioning of the heater control being defined by at least one control parameter, wherein the control device comprises:
a nominal parameter provision unit for providing at least one nominal parameter value selected from one or more of a setpoint of a controlled variable of the heater control, a setpoint of a change of the controlled variable with time, a setpoint of a heater parameter, and/or a setpoint of a change in the heater parameter with time, the at least one nominal parameter value being predetermined and stored in and/or input into the heating device;
an actual parameter detection unit for detecting at least one actual parameter value corresponding to the at least one nominal parameter value during the heating process, the at least one actual parameter value being one or more of an actual value of the controlled variable, an actual value of a change of the controlled variable with time, an actual value of the heater parameter, and/or an actual value of a change in the heater parameter with time;
a control change unit adapted to change the at least one control parameter value by:
comparing the at least one nominal parameter value to the at least one actual parameter value;
determining that the at least one actual parameter value falls outside a deviation from the at least one nominal parameter value; and
automatically changing the at least one control parameter value to bring the temperature of a building material layer being solidified within a control region Tactual+−deltaT, where Tactual is a working temperature and deltaT is a change in temperature over a specific period of time, the at least one control parameter being a maximum heating power of the heater device, a maximum or minimum change of the heating power of the heater device with time, the deviation, or a control type of a PID controller.

2. The device according to claim 1, wherein the at least one control parameter is the control type of the PID controller and includes a P gain, a reset time or a derivative time of a proportional, integral or derivative term of the heater control.

3. The device according to claim 1, wherein the at least one nominal parameter is at least one of the following quantities:
a work temperature, a maximum and/or minimum change of a temperature of the building material with time, a maximum duration for the heating of the building material up to the work temperature from a start of the application of a new building material layer, and a control accuracy.

4. The device according to claim 1, wherein the actual parameter detection unit detects a time needed for heating a newly applied building material layer up to a work temperature and the control change unit automatically changes the at least one control parameter value if a predetermined maximum heating-up time is exceeded.

5. The device according to claim 1, wherein the control change unit includes a fuzzy control for changing the at least one control parameter value.

6. The device according to claim 1, wherein the control change unit includes a neural network and/or an evolutionary algorithm that are/is used for changing the at least one control parameter value, wherein the neural network and/or evolutionary algorithm access actual parameter values that were previously detected.

7. An additive manufacturing apparatus that builds one or more objects at a time through a layer-wise application of building material, each new layer being on top of and solidified to a previous underlying layer, with a plurality of building material layers corresponding to cross-sections of the one or more objects, the apparatus comprising:
- a heating device that heats the building material;
- an irradiation unit that solidifies the building material after the building material is heated;
- a heater control that controls the heating device according to at least one control parameter; and
- a control unit including:
  - a nominal parameter provision unit for providing at least one nominal parameter value selected from one or more of a setpoint of a controlled variable of the heater control, a setpoint of a change of the controlled variable with time, a setpoint of a heater parameter, and/or a setpoint of a change in the heater parameter with time, the at least one nominal parameter value being predetermined and stored in and/or input into the heating device;
  - an actual parameter detection unit for detecting at least one actual parameter value corresponding to the at least one nominal parameter value during the heating process, the at least one actual parameter value being one or more of an actual value of the controlled variable, an actual value of a change of the controlled variable with time, an actual value of the heater parameter, and/or an actual value of a change in the heater parameter with time;
- a control change unit adapted to change the at least one control parameter value by:
  - comparing the at least one nominal parameter value to the at least one actual parameter value;
  - determining that the at least one actual parameter value falls outside a deviation from the at least one nominal parameter value; and
  - automatically changing the at least one control parameter value to bring the temperature of a building material layer being solidified within a control region Tactual+−deltaT, where Tactual is a working temperature and deltaT is a change in temperature over a specific period of time, the at least one control parameter being a maximum heating power of the heater device, a maximum or minimum change of the heating power of the heater device with time, the deviation, or a control type of a PID controller.

8. The apparatus according to claim 7, wherein the at least one control parameter is the control type of the PID controller and includes a P gain, a reset time or a derivative time of a proportional, integral or derivative term of the heater control.

9. The apparatus according to claim 7, wherein the at least one nominal parameter is at least one of the following quantities:
  a work temperature, a maximum and/or minimum change of a temperature of the building material with time, a maximum duration for the heating of the building material up to the work temperature from a start of the application of a new building material layer, and a control accuracy.

10. The apparatus according to claim 7, wherein the actual parameter detection unit detects a time needed for heating a newly applied building material layer up to a work temperature and the control change unit automatically changes the at least one control parameter value if a predetermined maximum heating-up time is exceeded.

11. The apparatus according to claim 7, wherein the control change unit includes a fuzzy control for changing the at least one control parameter value.

12. The apparatus according to claim 7, wherein the control change unit includes a neural network and/or an evolutionary algorithm that are/is used for changing the at least one control parameter value, wherein the neural network and/or evolutionary algorithm access actual parameter values that were previously detected.

* * * * *